(12) United States Patent
Fox et al.

(10) Patent No.: US 7,915,331 B2
(45) Date of Patent: Mar. 29, 2011

(54) FLUOROELASTOMER PROCESSING AID MASTERBATCH AND METHOD FOR PRODUCING SAME

(75) Inventors: Peter Anthony Fox, Wilmington, DE (US); Steven Richard Oriani, Landenberg, PA (US)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 114 days.

(21) Appl. No.: 12/349,120

(22) Filed: Jan. 6, 2009

(65) Prior Publication Data
US 2010/0174011 A1    Jul. 8, 2010

(51) Int. Cl.
*C08K 5/13*    (2006.01)
(52) U.S. Cl. .................. 524/351; 525/197; 525/199
(58) Field of Classification Search .................. 524/351; 525/197, 199
See application file for complete search history.

(56) References Cited

U.S. PATENT DOCUMENTS

| | | | |
|---|---|---|---|
| 3,125,547 A | 3/1964 | Blatz | |
| 4,281,092 A | 7/1981 | Breazeale | |
| 5,789,489 A | 8/1998 | Coughlin et al. | |
| 5,789,509 A | 8/1998 | Schmiegel | |
| 6,005,025 A | 12/1999 | Bhatia et al. | |
| 6,048,939 A | 4/2000 | Priester | |
| 6,642,310 B2 | 11/2003 | Chapman, Jr. et al. | |
| 6,875,814 B2 | 4/2005 | Chapman, Jr. et al. | |
| 7,001,951 B2 | 2/2006 | Chapman, Jr. et al. | |

FOREIGN PATENT DOCUMENTS
WO    0127197 A    4/2001

*Primary Examiner* — Edward J Cain

(57) ABSTRACT

A fluoroelastomer masterbatch comprising a particulate matrix material wherein the particles of the matrix material have an average size selected from the range of from 1 μm to 1000 μm in diameter, the concentration of fluoroelastomer is from about 0.2% to 40% by weight, and the fluoroelastomer is dispersed within the interstitial spaces of the particulate matrix material.

4 Claims, 3 Drawing Sheets large fluoroelastomer particles that change during processing, and control of the resulting particle size is difficult.

FLUOROELASTOMER PROCESSING AID MASTERBATCH AND METHOD FOR PRODUCING SAME

BACKGROUND OF THE INVENTION

The present invention relates to a fluoroelastomer processing aid masterbatch that is formulated using a particulate matrix material, and, more particularly, to a method for dispersing a wide range of elastomers in a matrix material to achieve improved uniformity and control of elastomer particle size and improved elastomer particle size distribution in the masterbatch.

U.S. Pat. No. 3,125,547 describes the use of 0.01-2.0 wt. % of a fluorocarbon polymer that is in a fluid state at the process temperature, such as a fluoroelastomer, to reduce die pressure in extrusions of non-fluorinated polymers, such as high and low density polyethylene and other polyolefins. Use of such additives can provide for significant increases in extrusion rates without the extruded polymer developing melt fracture.

U.S. Pat. No. 6,005,025 describes a method for dispersing solid forms of additives in synthetic thermoplastic polymers where the particle size of the additive is fixed and not likely to change during processing. In the case of fluoroelastomers, however, their particle size and particle size distribution can change rather dramatically during processing at normal melt-processing temperatures.

U.S. Pat. No. 6,048,939 describes a method for producing extrudable compositions and masterbatches comprising a minor amount of fluoropolymer dispersed in a non-fluorinated host resin, by adding fluoroelastomer latex directly to the host resin. The mixture is then allowed to dry to remove the liquid component of the latex, or extruded directly so as to use the extrusion process to de-volatilize the mixture. However, the described method does not contemplate using the physical dimensions of the host resin as a means of controlling the fluoropolymer particle size in the mixture. Particle size of the host resin is not disclosed, and the fluoroelastomer latex is mixed with the host polymer at temperatures which are above the melting point of the host polymer.

U.S. Pat. Nos. 6,642,310 and 6,875,814 describe extrudable compositions comprising a non-fluorinated host resin having from 25 to 2000 ppm of a fluoropolymer dispersed therein, in which the fluoropolymer particles have a weight average diameter in the range of 2 to 10 microns. It is stated that a size range of from 2 to 10 microns enables the fluoropolymer to function more efficiently as a process aid, e.g., by reducing melt defects, such as melt fracture, in linear low density polyethylene.

It is well known that fluoropolymer process aids function by depositing a fluoropolymer coating on internal die surfaces, and that extrudable compositions containing a fluoropolymer process aid(s) exhibit preferred extrusion processability when the fluoropolymer is dispersed within a rather narrow size range, i.e., as taught by U.S. Pat. Nos. 6,642,310 and 6,875,814. However, the best currently known practice for achieving an optimal fluoropolymer size range relies on dispersing very large fluoropolymer particles (e.g., initially greater than about 100 microns in diameter) using conventional compounding techniques in which the host resin is in a liquid state. This technique relies on selecting fluoroelastomers having a narrow viscosity range, and incorporating therein an interfacial agent, such as, for example, a polyethylene glycol or polycaprolactone. (See, e.g., U.S. Pat. No. 7,001,951) Fluoroelastomer particle size distributions in such extrudable compositions tend to be very broad, having many particles smaller than optimal (i.e., less than 2 microns), and a small number of particles larger than optimal (i.e., greater than 10 microns). The smallest fluoroelastomer particles are essentially "wasted" because, being generally less than 2 microns in size, they are too small to effectively benefit extrusion processability of the composition. The largest particles have been observed to form defects in the extruded articles, particularly in cases of film extrusion.

Thus, there is a need for improved fluoroelastomer masterbatches for use as process aids that can achieve better uniformity and control of fluoroelastomer particle size and particle size distribution in the extrudable composition.

SUMMARY OF THE INVENTION

According to one aspect, the present invention is a fluoroelastomer process aid masterbatch comprising (a) a particulate matrix material wherein the particles of the matrix material have a number average or mean particle size selected from the range of from 1 μm up to 1000 μm in diameter and (b) containing from about 0.2% to 40% by weight of a fluoroelastomer. The fluoroelastomer is dispersed as discrete particles within the interstitial spaces of the particulate matrix material, and the size of the fluoroelastomer particles, which can vary over a wide range depending on the particulate matrix material selected, conforms to the size, or volume, available within the interstitial spaces of the adjoining matrix material particles.

According to another aspect, the present invention is method for producing a fluoroelastomer process aid masterbatch which comprises:

(a) forming an aqueous emulsion of a fluoroelastomer;

(b) blending the aqueous emulsion of fluoroelastomer with a particulate matrix material having a number average or mean particle size selected from the range of from 1 μm up to 1000 μm in diameter;

(c) coagulating the resulting blend to form a slurry of the fluoroelastomer; and (d) drying the slurry whereby the fluoroelastomer disperses to reside primarily, i.e., substantially, within the interstitial spaces that exist between adjoining matrix material particles. The resulting particle size of the fluoroelastomer conforms to the size, or available volume, within the interstitial spaces of the adjoining matrix material particles, with the proviso that the matrix material remains in a solid state during steps (b), (c) and (d). A fluoroelastomer process aid masterbatch produced according to the above-defined process and having the properties described herein is also intended to be within the scope of the present invention.

According to another aspect, the present invention is directed to a method for producing a uniform dispersion of a fluoroelastomer within a particulate matrix material wherein the matrix material has a number average or mean particle size selected from the range of from 1 μm up to 1000 μm in diameter, and the matrix material is a solid at a temperature up to 50° C., which comprises:

(a) forming an aqueous emulsion of the fluoroelastomer;

(b) blending the aqueous emulsion of fluoroelastomer with the particulate matrix material;

(c) coagulating the resulting blend to form a slurry of the fluoroelastomer; and (d) drying the slurry whereby the fluoroelastomer disperses to reside primarily, i.e., substantially, within the interstitial spaces that exist between adjoining matrix material particles. The resulting particle size of the fluoroelastomer conforms to the size, or the available volume, within the interstitial spaces.

In a preferred embodiment of the invention, the particulate matrix material is selected from the group consisting of polycaprolactone powder, polyethylene powder and polytetrafluoroelthylene (PTFE) micro-powder, and mixtures thereof. However, any other particulate matrix material that does not dissolve in the aqueous emulsion and provides the desired interstitial spacing for a given application may be used. When particulate matrix materials are used that remain solid at operating temperatures typically encountered during extrusion of a host resin through a die, preferably for best results the surface of the matrix material particles exhibit little or no adhesion, i.e., molecular attraction, to the surface of the fluoroelastomer particles.

The fluoropolymer process aid masterbatch of the present invention provides a high concentration of fluoroelastomer, e.g., greater than 2000 ppm fluoroelastomer, in a second particulate material. The fluoropolymer is generally uniformly dispersed within the second particulate material, meaning that the fluoroelastomer particles reside primarily within the interstitial spaces that exist between adjoining matrix material particles. The size of the dispersed fluoroelastomer particles are defined by the volume of the interstitial spaces.

DETAILED DESCRIPTION OF THE INVENTION

Figure 1:
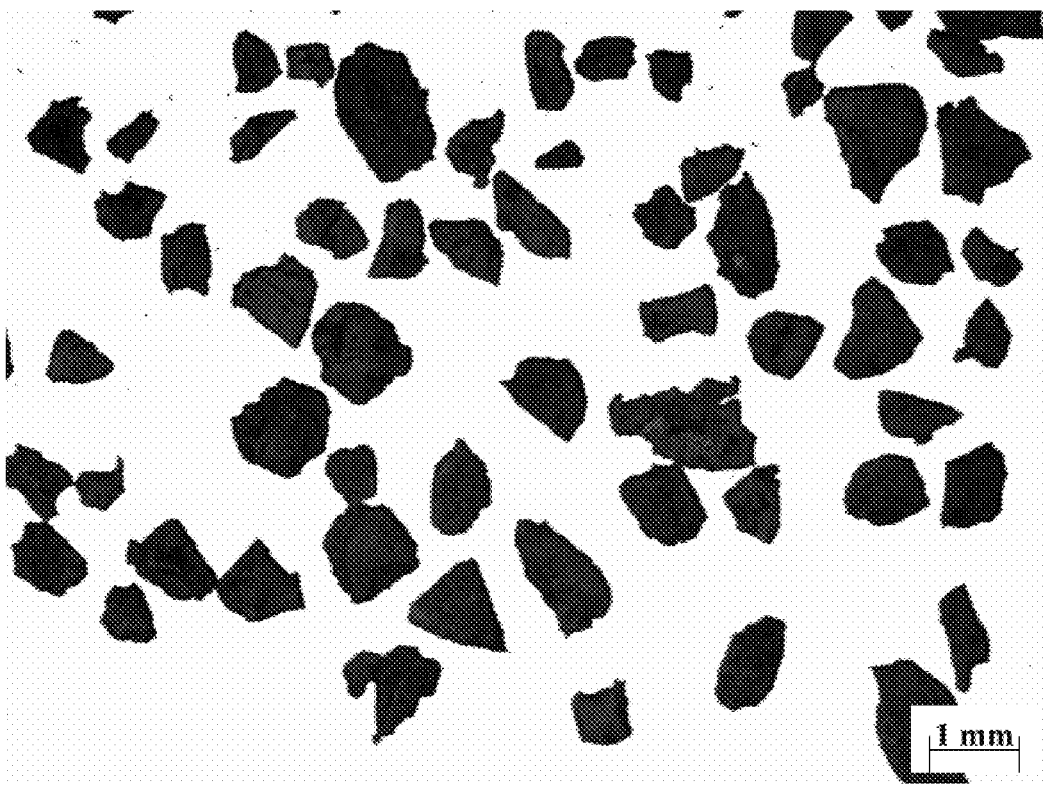
FIG. 1 is a photomicrograph of particles of fluoroelastomer polymer that have been cryogenically ground according to current commercial processing so that greater than 98% by weight pass through a 20 mesh screen.

The present invention is directed to a fluoroelastomer process aid masterbatch comprising (a) a particulate matrix material wherein the particles of the matrix material have a number average or mean particle size selected from the range of from 1 μm up to 1000 μm in diameter and (b) from about 0.2% to 40% by weight of a fluoroelastomer. The fluoroelastomer process aid masterbatch may be produced by:
  (a) forming an aqueous emulsion of the desired fluoroelastomer;
  (b) blending the aqueous emulsion of fluoroelastomer with a particulate matrix material having a number average particle size selected from the range of from 1 μm up to and including 1000 μm in diameter;
  (c) coagulating the resulting blend to form a slurry of the fluoroelastomer; and then
  (d) drying the slurry, with the proviso that the particulate matrix material remains in the solid state during steps (b), (c) and (d).

During the coagulation of the aqueous emulsion and subsequent drying, the fluoroelastomer disperses, or becomes dispersed, within the interstitial spaces that correspondingly form between adjoining matrix material particles with the fluoroelastomer having a resulting particle size that conforms to the size, or available volume, of the interstitial spaces that form between adjoining matrix material particles.

An aqueous emulsion, i.e., latex, of the desired fluoroelastomer can be prepared via a process which comprises free radical polymerization, optional pH adjustment of the thus-prepared emulsion, and optional concentration of the emulsion to form a solids-rich latex composition. In the first step of the polymerization process for preparing the fluoroelastomer latex, an aqueous emulsion of at least two monomers is formed. The first monomer may be selected from the group consisting of vinylidene fluoride and tetrafluoroethylene. At least one other fluorinated monomer may also be present in the emulsion. The emulsion is generally formed by introducing the gaseous monomers and water into a reaction vessel.

The most common free-radical initiators are 1) water soluble ammonium or potassium persulfate or 2) the redox system potassium persulfate and sodium sulfite. The initiator catalyzes the polymerization reaction and is generally present in amounts sufficient to give a radical flux of from 5 to 100 mmol/kg polymer. It is possible to minimize ionic end group concentrations by conducting the polymerization in the presence of low levels of chain transfer agents. Hydrogen-based alcohols, esters and halogens as well as various iodinated compounds, including diiodomethane, and fluoroalkyl iodides have been used with good results. Chain transfer agents which are not perfluorinated can be used in the polymerization reaction to introduce desirable fragments into the polymer chain for curing purposes, and are considered cure site moieties. Such agents include diiodo compounds that result in bound iodine, commonly at the end of the polymer chains. Preparative techniques for the fluoroelastomers and perfluoroelastomer latex compositions are described in general in Logothetis, Prog. Polymn. Sci, Vol. 14, 251-296 (1989) and in U.S. Pat. Nos. 4,281,092; 5,789,489; and 5,789,509.

The aqueous emulsion from the first step of the polymerization process is generally prepared in a continuous stirred tank reactor, although batch or semi-batch reactors may also be used. If the aqueous emulsion is prepared in a continuous process, aqueous solutions containing polymerization catalysts, surfactants, optional reducing agents, chain transfer agents, and buffers are added to the continuously stirred reactor. Simultaneously, monomers are fed to the reactor. Polymerization occurs, thereby resulting in formation of a fluoroelastomer latex composition. It has been found that surfactants can aid the polymerization process. The emulsion resulting from a continuous polymerization will typically have a solids content of around 20 percent by weight, although solids content can vary from a low of about 10 percent by weight up to 35 percent by weight. Particle size of the fluoroelastomer in the emulsion will typically be smaller than the target particle size for the resulting masterbatch.

Polymerization temperatures typically range from 40° C.-130° C., at pressures of 2 to 9 MPa and residence times of 10 to 240 minutes. A residence time of 20 to 60 minutes is typically followed for vinylidene fluoride copolymers. After polymerization, unreacted monomer may be removed from the reactor effluent by vaporization at reduced pressure, and further surfactant may be added.

Following preparation of the fluoroelastomer latex composition, its pH may be adjusted by addition of base. The base may be added before, in conjunction with, or following addition of the surfactant. That is, the order of addition of base and the optional additional surfactant is not critical. The amount of base added will be a quantity sufficient to adjust the pH of the fluoroelastomer latex composition to a value in the range of from 5 to 8. Inorganic or organic bases may be used, but typically sodium hydroxide, lithium hydroxide, potassium hydroxide, and ammonium hydroxide are used because of their availability and lower cost. At this stage the resulting latex composition typically has a solids content of about 20-40 percent by weight.

The resulting fluoroelastomer latex composition is then blended with the desired particulate matrix material which can have a number average or mean particle size in the range of from 1 μm up to and including 1000 μm in diameter. Mixing may be accomplished by any of a wide variety of techniques, including a high speed rotating blade mixer, low speed plough or ribbon blender, tumble blender, or any other convenient technique that will provide for generally uniform wetting of the particulate material with the latex. The selected matrix material type and particle size, or particle size range, will depend on the particular end use and additional processing steps that may be required for the masterbatch being prepared. The amount of fluoroelastomer in the blend will be selected so as to yield a fluoroelastomer concentration in the finished, i.e., dried, masterbatch of at least 2000 ppm, and preferably at least 5000 ppm (0.5% by weight). The upper limit of fluoroelastomer content will depend on the particle size and density of the selected particulate material, as well as the desired target fluoroelastomer particle size in the finished masterbatch. However, the content of fluoroelastomer may range as high as 40% by weight.

The resulting blend is an aqueous slurry of the fluoroelastomer and the matrix material. Coagulant is then mixed into the slurry. A wide variety of coagulants may be used, including salts, such as, for example, aluminum sulfate, potassium aluminum sulfate, calcium nitrate, magnesium sulfate, and other coagulants familiar to those skilled in the art. As the slurry coagulates, the fluoroelastomer disperses, i.e., becomes trapped, within the interstitial spaces that form between adjoining matrix material particles with a resulting particle size of the fluoroelastomer that conforms to the size, or available volume, within the interstitial spaces of the adjoining matrix material particles.

The present invention provides the ability to achieve a relatively high concentration of fluoroelastomer process aid in a masterbatch comprising a second matrix material in a dispersed form over a wide range of fluoroelastomer particle sizes. This is possible because the size of the fluoropolymer particles in the dispersion can be controlled by the interstitial spaces that are formed between the adjoining particles of the selected particulate matrix material. The uniformity and size of the dispersed fluoropolymer particles is limited primarily by the size and uniformity of the selected particulate matrix material. The slurry is then dried at any convenient temperature below the temperature of the melting point of the particulate material, preferably less than about 200° C.

In a preferred embodiment of the invention the particulate matrix material is selected from the group consisting of polycaprolactone powder, polyethylene powder and polytetrafluoroelthylene (PTFE) micro-powder, and mixtures thereof. However, any other particulate matrix material that does not dissolve in the latex and provides the desired interstitial spacing for a given application may be used.

The invention produces a well defined fluoroelastomer particle size in a masterbatch that is essentially independent of fluoroelastomer viscosity, which, in turn, helps to generate a more uniform particle size distribution when the masterbatch is introduced and diluted into an extrudable host composition. The composition to be extruded may optionally contain an interfacial agent, such as polycaprolactone or polyethylene glycol, that may be added simultaneously with the addition/dilution of the masterbatch. The interfacial agent itself may comprise the particulate material, or no interfacial agent may be used.

Fluoroelastomers useful as process aids in practicing the invention are fluoropolymers that are normally in the fluid state at room temperature and above, i.e. fluoropolymers which have a glass transition temperature ($T_g$) below about 20° C. and which exhibit little or no crystallinity at room temperature. It is preferred for ease of processing, but not essential, to employ fluoroelastomers having a fluorine to hydrogen ratio of at least 1:1.5. Fluorinated monomers which may be copolymerized to yield suitable fluoroelastomers include, but are not limited to, vinylidene fluoride, hexafluoropropylene, chlorotrifluoroethylene, tetrafluoroethylene and perfluoroalkyl perfluorovinyl ethers. Specific examples of fluoroelastomers which may be employed may include, but are not limited to, copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and a comonomer selected from hexafluoropropylene, 1-hydropentafluoropropylene or 2-hydropentafluoropropylene; and copolymers of tetrafluoroethylene, propylene and, optionally, vinylidene fluoride, all of which are known in the art. In some cases these copolymers may also include bromine-containing comonomers as taught, for example, in Apotheker and Krusic, U.S. Pat. No. 4,035,565, or terminal iodo-groups, as taught in U.S. Pat. No. 4,243,770. The latter patent also describes the incorporation of iodo group-containing fluoroolefin comonomers into fluoroelastomers. When fluorinated monomers are present in these copolymers in certain molar ratios, the glass transition temperature of the polymer is near or below 0° C., and the compositions are useful elastomers that are readily available articles of commerce. Preferably, the fluoroelastomers employed in the masterbatch compositions of this invention contain copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride.

EXAMPLES

The current process for producing a fluoropolymer process aid on a commercial basis typically involves the following general steps:
1. Polymerization—Polymerization may be batch, semibatch, or continuous, but in all cases the fluoropolymer forms an emulsion in water while in the reaction vessel. The emulsion particles can vary over a wide range depending on a variety of process variables, but for best results large emulsion particles, e.g., greater than 2 microns, are avoided. Generally, emulsion particles are 1 micron or smaller in size (average diameter), and they make up from 15 percent to 25 percent by weight of the material in the reactor.
2. Finishing—The polymer must be separated from the water phase of the emulsion, and optionally washed to remove soap (if used), buffer, coagulant, etc. There are a variety of ways to separate water and polymer, but the most widely practiced method for convenience, availability and cost is the use of an ionic coagulant, such as, for example, aluminum sulfate, calcium nitrate, or other salt. An ionic coagulant eliminates repulsion between particles due to the electrical double layer, with the result that the polymer collapses to form a "crumb". The crumb corresponds to a spongy network, but in essence is a clump of polymer. The clumps can be washed, dried and optionally extruded into a sheet or into pellets.
3. Grinding—The clumps, pellets or sheets are then ground up to form a coarse powder. Grinding may be accomplished cryogenically whereby the final polymer particles will pass through a 16 to 20 mesh screen. Cryogenically ground 20 mesh fluoroelastomer particles can be seen in FIG. 1. Particle size distribution for the sample shown in FIG. 1 is as follows:

| Number of Images: | 40 |
|---|---|
| Total Particle Count: | 1183 |
| Pixel Size (μm): | 18.52 |
| Microscopy Technique: | OM/Transmission |
| Sample Prep.: | spread |
| Mean (μm): | 851 |
| Max. (μm): | 1495 |
| D10 (μm): | 656 |
| D16 (μm): | 729 |
| D50 (μm): | 1017 |
| D84 (μm): | 1258 |
| D90 (μm): | 1306 |

Figure 2:
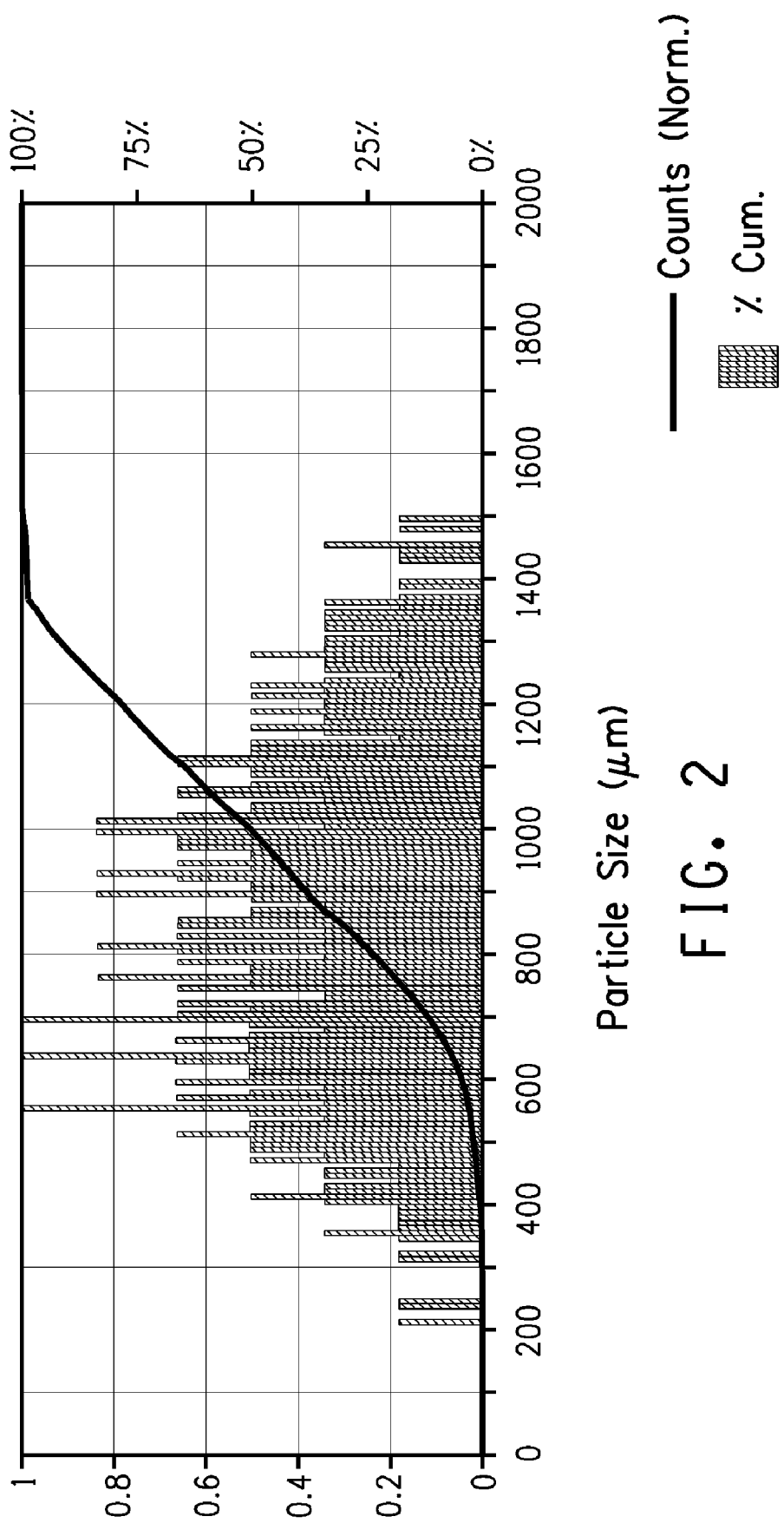
FIG. 2 is a graphical representation of particle size distribution for the fluoroelastomer sample prepared according to Example 1.

A graphical representation of particle size for the sample can be seen in FIG. 2. It is noteworthy that fluoroelastomer particles produced by conventional cryogenic grinding are roughly 100 times larger that the optimal 2 to 12 microns weight average particle size when the process aid is extruded in a host resin through a die.

4. Final Mixing/blending—After grinding, the fluoroelastomer sample is typically mixed with a dusting agent to prevent massing and an (optional) interfacial agent to enhance performance as a process aid. The finished product is then bagged for sale or transport for further processing.

As noted above, fluoropolymer particles from the foregoing commercial process are generally very large, i.e., in the range of from 200 to about 1200 microns in size. Users of process aids of this size may not have the capability to disperse the fluoropolymer sufficiently in the host resin to prevent the fluoropolymer particles from creating defects in the final extrudate. Fluoropolymer process aids in a host resin tend not to break up uniformly into a narrow particle size distribution, but instead exhibit a very wide distribution of sizes.

Examples C-1 and 1-10

Materials (a) A $VF_2$/HFP copolymer fluoroelastomer was prepared by a continuous emulsion polymerization process, carried out at 108° C. in a well-stirred 2.0-liter stainless steel liquid full reaction vessel. An aqueous solution, consisting of 6.09 g/hour (g/h) ammonium persulfate initiator, 0.91 g/h sodium hydroxide, and 0.70 g/h sodium sulfite, was fed to the reactor at a rate of 10.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1547 g/h vinylidene fluoride ($VF_2$) and 1231 g/h hexafluoropropylene (HFP) fed through a diaphragm compressor. After 0.5 hours, collection of the effluent dispersion was begun and collection continued for 3.0 hours. The effluent latex, which had a pH of 4.30 and contained 19.60 wt. % solids, was separated from residual monomers in a degassing vessel at atmospheric pressure. The resulting fluoroelastomer had a Mooney viscosity (ML1+10, 150° C.) of 98.9, and based on the polymerization conditions the composition was expected to be close to 60% vinylidene fluoride and 40% hexafluoropropylene.

(b) Microthene® MN71120, a low density polyethylene, available from LyondellBasell, having the following properties:

| Melt index (190° C., 2160 g): | 22 g/10 minutes |
|---|---|
| Density: | 0.915 g/cc |
| Mean particle size: | 35 mesh (about 425 micron) |

(c) Microthene® FA 70000, a high density polyethylene, available from LyondellBasell, having the following properties:

| Melt index (190° C., 2160 g): | 10 g/10 minutes |
|---|---|
| Density: | 0.952 g/cc |
| Mean particle size: | 20 microns |

(d) LL1002.09, a linear low density polyethylene, available from ExxonMobile Corp., having the following properties:

| Melt index (190° C., 2160 g): | 2 g/10 minutes |
|---|---|
| Density: | 0.918 g/cc |

Particle Size Distribution Analysis

The distribution of fluoroelastomer particle sizes obtained for the compositions of the examples was determined using a Carl Zeiss LSM 510 Confocal microscope. Using 488 nm laser line for excitation, three dimensional images of the fluoroelastomer particles were captured. The smallest resolvable particle using this equipment was 0.5 micron. About 200 to 900 particles were imaged in each sample, and the images were analyzed to determine the equivalent diameter for a spherical particle using a Khoros image analysis software package. Each particle diameter was estimated to the nearest 0.1 micron.

A summary of the methods used to produce comparative composition C1 and inventive compositions 1-10 are shown in Table I, below.

TABLE I

| Example | Microthene ® Type | Emulsion (g) | Water ml | Grams of 50% Aluminum sulfate soln | Aluminum sulfate addition | Wash | FKM wt % |
|---|---|---|---|---|---|---|---|
| C1 | none | 500 | none | 60 | regular | Yes | 100 |
| 1 | MN71120 | 26.3 | 224 | 2 | reverse | Yes | 5.14 |
| 2 | FA7000 | 125 | 125 | 10 | reverse | No | 20.48 |
| 3 | MN71120 | 125 | 125 | 10 | reverse | Yes | 20.48 |
| 4 | FA7000 | 125 | 125 | 10 | reverse | Yes | 20.48 |

TABLE I-continued

| Example | Microthene ® Type | Emulsion (g) | Water ml | Grams of 50% Aluminum sulfate soln | Aluminum sulfate addition | Wash | FKM wt % |
|---|---|---|---|---|---|---|---|
| 5 | FA7000 | 26.3 | 224 | 2 | reverse | Yes | 5.14 |
| 6 | MN71120 | 125 | 125 | 10 | reverse | No | 20.48 |
| 7 | FA7000 | 26.3 | 224 | 2 | reverse | No | 5.14 |
| 8 | MN71120 | 26.3 | 224 | 2 | reverse | No | 5.14 |
| 9. | MN71120 | 26.3 | 224 | 2 | regular | Yes | 5.14 |
| 10 | FA7000 | 26.3 | 224 | 2 | Regular | Yes | 5.14 |

Comparative composition C1 was produced by the conventional coagulation technique described above, in which 60 grams of a 50% aluminum sulfate solution was added to 500 g of fluoroelastomer emulsion, while stirring to effect the coagulation. The resulting coagulum was filtered, washed with de-ionized water, and dried in an oven at 70° C. overnight to produce a sponge-like crumb.

Inventive compositions 1 through 10 were produced by first diluting the fluoroelastomer emulsion with de-ionized water, the amounts of each being shown in Table I. The specified type of particulate material (either Microthene® MN71120 or FA70000) was then dispersed in de-ionized water using a high speed blender charged with 100 g of the particulate material and 200 g of water. A 50% solution of aluminum sulfate in water was used as the coagulant. The term "regular" coagulant addition specified in Table I is used to indicate that the fluoroelastomer emulsion was first mixed into the particulate/water mixture and then the coagulant was added to the resulting mixture. The term "reverse" coagulant addition is used in Table I to indicate that the fluoroelastomer emulsion was first blended into the water/particulate mixture and then that resulting mixture was added to the coagulant. In either case, the fluoroelastomer emulsion was first diluted with water as indicated in Table I to achieve the desired concentration prior to mixing with the particulate material and prior to coagulation. During coagulation the entire mixture was blended at high speed for 1 minute. After coagulation, the water was drained from the mixture using a nylon fabric as a filter medium. For all samples that were washed as indicated in Table I, three (3) aliquots of 200 ml water were poured through the sample. In a final preparatory step, all samples were transferred to a pan and dried in an oven overnight at 70° C.

Comparative composition C1 and inventive compositions 1 through 10 were then blended with polyethylene to demonstrate the improved fluoroelastomer particle size distributions that result according to the invention. The blend compositions are shown in Table II, below, each of which was produced using a Bradender® mixing bowl operating at 50 rpm at a temperature set point of 150° C. using cam rotors. Mixing time was 3 minutes, and total batch weight was 60 grams. Each of the compositions in Table II comprises 1% by weight fluoroelastomer. Because the compositions in Table I contain varying amounts of Microthene® particulate material, which melts to form part of the polyethylene host composition during Bradender® mixing, a make-up level of Microthene® MN71120 was added to certain compositions in Table II to maintain a generally uniform level of the Microthene® component in all compositions.

TABLE II

| Composition | CA % | A % | B % | C % | D % | E % | F % | G % | H % | I % | J % |
|---|---|---|---|---|---|---|---|---|---|---|---|
| LL 1002.09 | 80.54 | 80.54 | 80.54 | 80.54 | 80.54 | 80.54 | 80.54 | 80.54 | 80.54 | 80.54 | 80.54 |
| Microthene ® MN71120 | 18.46 | | 14.58 | 14.58 | 14.58 | | 14.58 | | | | |
| C1 | 1 | | | | | | | | | | |
| 1 | | 19.46 | | | | | | | | | |
| 2 | | | 4.88 | | | | | | | | |
| 3 | | | | 4.88 | | | | | | | |
| 4 | | | | | 4.88 | | | | | | |
| 5 | | | | | | 19.46 | | | | | |
| 6 | | | | | | | 4.88 | | | | |
| 7 | | | | | | | | 19.46 | | | |
| 8 | | | | | | | | | 19.46 | | |
| 9 | | | | | | | | | | 19.46 | |
| 10 | | | | | | | | | | | 19.46 |
| Results of confocal Image Analysis | | | | | | | | | | | |
| Mean (u) | 1.8 | 3 | 3.9 | 4 | 3.8 | 3.5 | 5 | 2.7 | 4.1 | 4 | 2.9 |
| Max (u) | 44.7 | 22.3 | 22.5 | 39.5 | 26.7 | 37.9 | 39.5 | 35.4 | 39.2 | 32.9 | 34.5 |
| Particles counted | 651 | 775 | 340 | 344 | 361 | 384 | 209 | 924 | 371 | 466 | 596 |
| Vol % particles 2-10 u | 3.04 | 28.24 | 19.64 | 29.56 | 17.75 | 19.34 | 8.84 | 25.21 | 12.10 | 35.80 | 22.44 |

Figure 3:
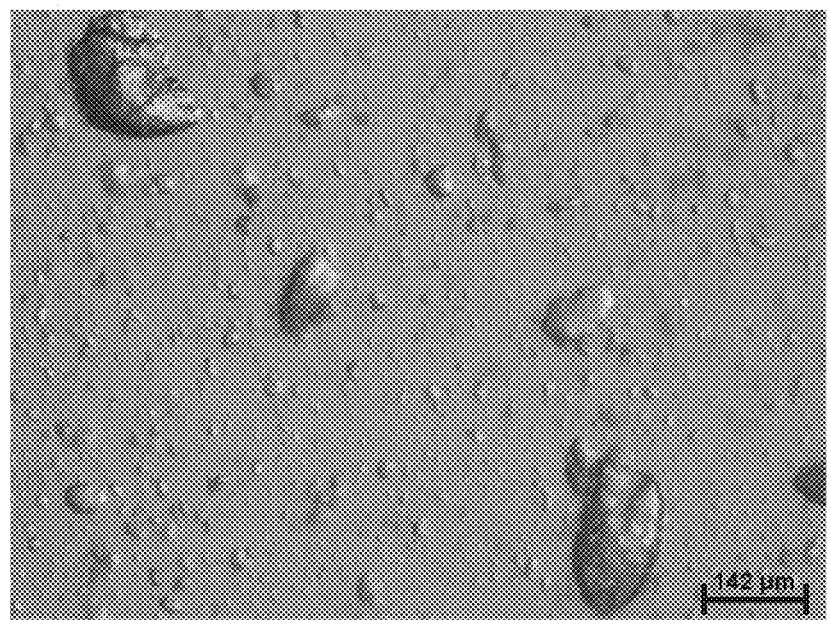
FIG. 3 is a photomicrograph of a conventional process aid (diluted Composition CA from Example C1) which illustrates the broad distribution that results when fluoropolymer particles are dispersed in polyethylene using current methods.
Figure 4:
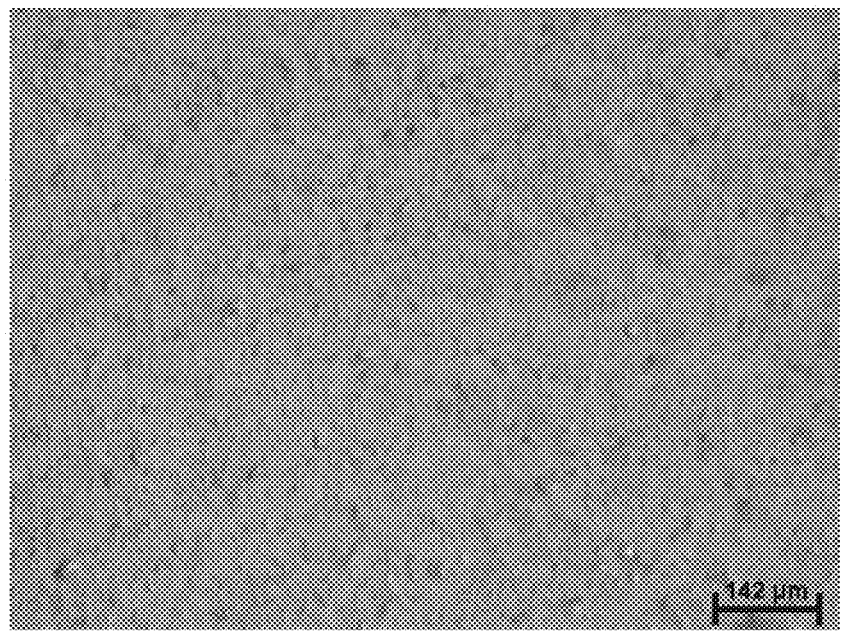
FIG. 4 is a photomicrograph of a composition produced according to the invention.

The results of the confocal image analysis shown in Table II demonstrate that each of the inventive compositions 1-10 produce a narrower fluoroelastomer particle size distribution than comparative composition C1 when diluted in polyethylene. It is noteworthy that when comparative composition C1 was diluted to produce control composition CA, the mean particle size was 1.8 microns, and the largest observed particle was 44.7 microns in diameter. All of the diluted compositions according to the invention (A through J) exhibit larger mean particle sizes, yet smaller maximum particle sizes. This smaller deviation of the particles in the distribution from the mean demonstrates that the compositions produced according to the invention provide better control over the dispersion process than the conventional approach. A photomicrograph of Composition CA can be seen in FIG. 3. FIG. 4 is a photomicrograph of a composition produced according to the invention when diluted and used as a process aid in polyethylene. It illustrates a very fine uniform dispersion.

U.S. Pat. No. 6,642,310, as identified above, teaches that for process aids the optimal fluoropolymer weight average particle size (diameter) entering the extruder die should lie within 2 to 10 microns, and that particles larger than 10 microns may cause defects in the extrudate. The results shown in Table II indicate that compositions produced according to the invention can be diluted to produce a far greater percent of particles within the desired 2 to 10 micron size range, and in many cases over ten times that of the diluted control composition CA.

What is claimed is:

1. A method for producing a fluoroelastomer masterbatch which comprises:
   (a) forming an aqueous emulsion of a fluoroelastomer;
   (b) blending the aqueous emulsion of fluoroelastomer with a particulate matrix material having a number average or mean particle size selected from the range of from 1 µm to 1000 µm in diameter;
   (c) coagulating the resulting blend to form a slurry of the fluoroelastomer; and
   (d) drying the slurry whereby the fluoroelastomer becomes dispersed within the interstitial spaces that form between adjoining matrix material particles with a resulting particle size of the fluoroelastomer that conforms to the size of the said interstitial spaces.

2. The method of claim 1 wherein the particulate matrix material is selected from the group consisting of polycaprolactone powder, polyethylene powder, polytetrafluoroelthylene (PTFE) micro-powder and mixtures thereof.

3. A method for producing a uniform dispersion of a fluoroelastomer within a particulate matrix material wherein the matrix material has a number average or mean particle size selected from the range of from 1 µm to 1000 µm in diameter which comprises:
   (a) forming an aqueous emulsion of the fluoroelastomer;
   (b) blending the aqueous emulsion of fluoroelastomer with the particulate matrix material;
   (c) coagulating the resulting blend to form a slurry of the fluoroelastomer; and
   (d) drying the slurry whereby the fluoroelastomer disperses and becomes trapped within the interstitial spaces that form between adjoining matrix material particles with a resulting particle size of the fluoroelastomer that conforms to the size of the said interstitial spaces, with the proviso that the particulate matrix material remains solid during steps (b), (c) and (d).

4. The method of claim 3 wherein the particulate matrix material is selected from the group consisting of polycaprolactone powder, polyethylene powder, polytetrafluoroelthylene (PTFE) micro-powder and mixtures thereof.

* * * * *